Dec. 5, 1961  A. ALLEN  3,011,854
CONTINUOUS REUSABLE RECORDING CHART DEVICE
Filed Dec. 30, 1959  2 Sheets-Sheet 1
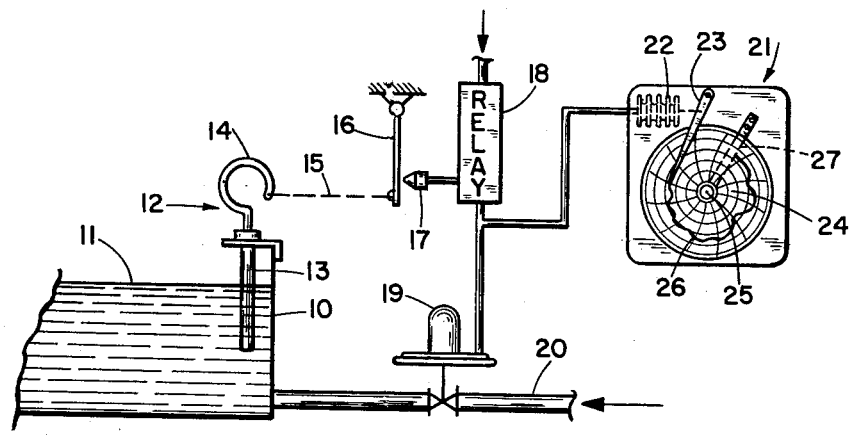
FIG. I
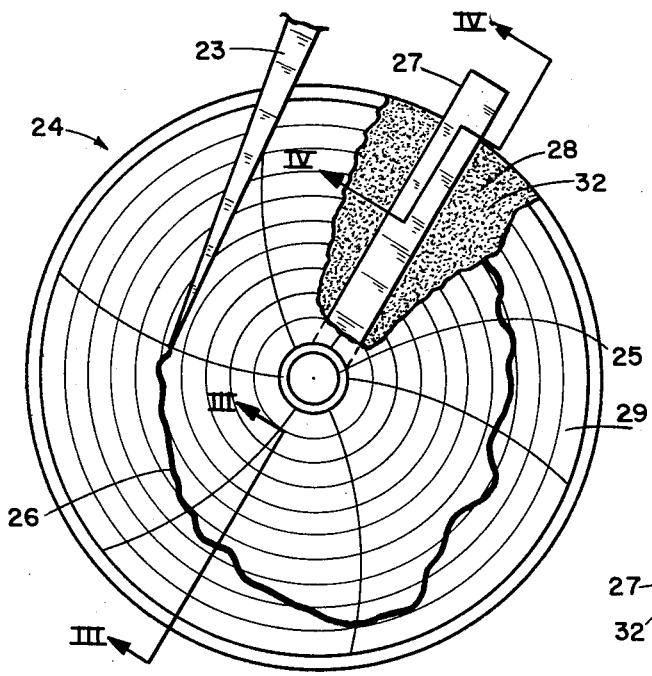
FIG. II
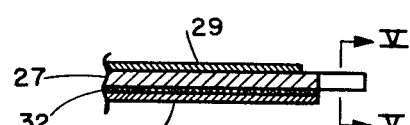
FIG. IV
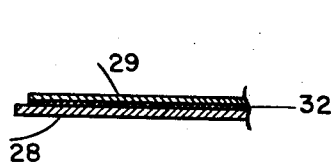
FIG. III
FIG. V
INVENTOR
ALBERT ALLEN
BY
Lawrence H. Dalton
AGENT

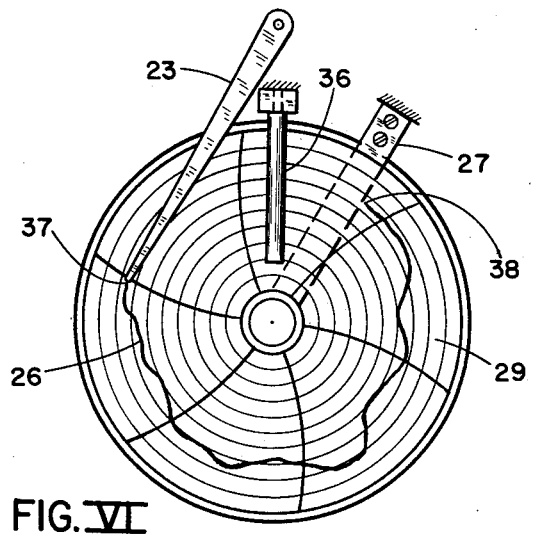
FIG. VI
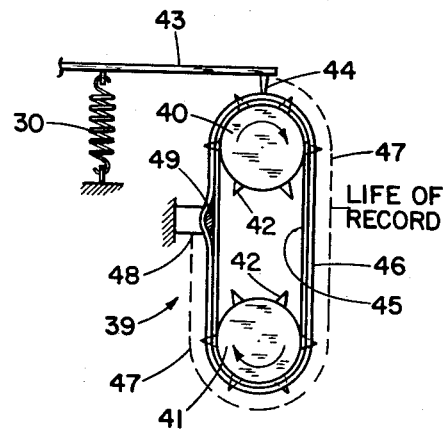
FIG. VII
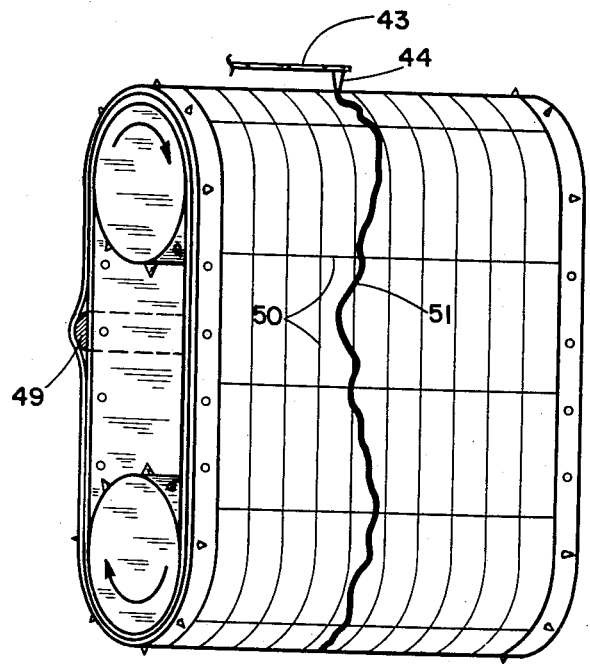
FIG. VIII
INVENTOR
ALBERT ALLEN
AGENT

United States Patent Office 3,011,854
Patented Dec. 5, 1961

3,011,854
CONTINUOUS REUSABLE RECORDING
CHART DEVICE
Albert Allen, Sharon, Mass., assignor to The Foxboro Company, Foxboro, Mass., a corporation of Massachusetts
Filed Dec. 30, 1959, Ser. No. 862,854
1 Claim. (Cl. 346—21)

This invention relates to industrial instrumentation and has particular reference to such instrumentation wherein a continuous record is made of a variable condition.

A simple combination of such a system is a sensing element such as a temperature measuring unit in a liquid tank, a control device which responds to the output of the temperature measuring element to operate a recording device, and an operating device in a pipe line, such as a steam line to the liquid tank to offset temperature changes to which the sensing element has responded.

As a part of this combination various forms of recording devices have been used. A standard form of recording device of this nature is a moving chart, either a rotating circular chart or a continuous strip chart over which a pen is moved transversely in accordance with changes in a variable condition to form line variations which are representative of the changes in the variable condition. With such a device the chart must be changed within a relatively short period of time and the recording process is thus interrupted. This action not only breaks up the recording process but also takes the time and attention of an operator. This situation can prove to be a costly factor in the operation of an industrial process system.

This invention, on the other hand, provides a continuously operating system wherein a single recording chart is used repeatedly, with the record thereon maintained for a predetermined period and then automatically erased to make the chart ready for a new record.

This is accomplished in the present invention by the use of a chart base of dark color paper with a tacky, waxy surface layer of paraffin and an overlying clear plastic sheet, such as polyvinyl, which is pressed against the tacky base by a recording stylus. As a result, at the points touched by the stylus, marks appear on the plastic sheet due to the grooving contact of the plastic sheet with the tacky base. The plastic sheet is provided with a printed form of a chart thereon and this chart is movable either by rotation or in strip chart line motion so that the stylus moves across the chart leaving an indication record of the variable condition in the form of a suitable marking arrangement across the chart. As the chart unit continues in its movement, a resetting arm provides a separation between the plastic sheet and the waxy base and consequently the recorded mark is erased. Thus, as the chart in its continuous movement again arrives at the marking stylus, it is clean and unmarked and ready for a new record.

With this arrangement it is possible to use a single chart on a continuous basis with no interruption time and with no operator time other than reading the chart when desired. The chart shows a record for a predetermined maximum length of time, prior to the actual marking time. In many cases, such a temporary limited period recording is well sufficient for the needs of the monitoring of the variable condition involved.

It is, therefore, an object of this invention to provide a new and improved industrial instrumentation recording chart system combination.

It is a further object of this invention to provide a continuous reusable recording chart in combination in a system of industrial instrumentation.

Other objects and advantages of this invention will be in part apparent and in part pointed out hereinafter, and in the accompanying drawings, wherein:

FIGURE I is an illustration of an industrial system combination according to this invention;

FIGURE II is an enlarged face view of a rotatable chart assembly used in the combination of this invention;

FIGURE III is a fragmentary cross section taken on line III—III of FIGURE II;

FIGURE IV is a fragmentary cross section taken on line IV—IV of FIGURE II as if the device were whole;

FIGURE V is a cross section taken on line V—V of FIGURE IV;

FIGURE VI is another face view of a rotatable chart device in the combination according to this invention wherein the record line of representation of a variable condition is shown from the point of initiation to the point of erasure;

FIGURE VII is a side view illustration of a continuous reusable strip chart device for use in the combination according to this invention; and FIGURE VIII is another illustration of a strip chart form of recording device, according to the combination of this invention, wherein the chart pattern on the plastic sheet is illustrated, with a record line thereon.

The FIGURE I showing, in illustration of an industrial instrument system combination according to this invention, includes a tank 10 containing a body of liquid 11 whose temperature is to be controlled, and a sensing element unit 12 comprising a temperature bulb 13 with a Bourdon tube device 14 as a conventional filled system for producing a movement in response to a temperature change in the body of liquid 11. In furtherance of this combination, the movement of the Bourdon 14 is applied, as indicated by dotted line 15, to a baffle 16 of a nozzle baffle pneumatic control system including a nozzle 17 which the movement of the baffle 16 variably restricts, and a pneumatic relay 18 of the conventional type. The output of the relay 18 is directed to an operating valve 19 as a means of varying a flow into the tank 10 through a pipe 20 to maintain a desired temperature in the liquid 11. The pipe 20 may be a steam pipe.

The output of the control relay 18 is also applied to a recorder unit 21 wherein, through a bellows 22, the pneumatic signal in representation of the temperature change in the bulb 13 is applied to a recorder marker arm 23 to produce recording movement back and forth across the face of a chart unit 24. The chart unit 24 is mounted for rotation about a central shaft 25 and as it is so rotated, a record line 26 is made thereon in accordance with the position of the marker arm 23. This record line is simply by way of illustration since there are other forms of record lines which can be readily applied to this device, such as a series of dots, or marks from a series of marking arms in different areas of the chart, and the like.

The chart unit 21 is provided with an erasure arm 27 fixedly mounted in suitable fashion (not shown) to a fixed portion of the chart unit. As will be explained hereinafter, the arm 27 is used to erase the record line 26 after a given period of rotation of the chart unit 24.

The chart unit 24 is further illustrated in FIGURE II and is shown to be formed with a base member 28 which has a top layer of waxy consistency to the extent of being tacky. A sheet of plastic 29 covers the base 28 and is rotatable therewith as a unit about the center post 25.

The marker arm 23 is pressed against the top of the plastic sheet 29 by conventional means such as the resiliency of the arm itself, or its mounting, or, as indicated later herein in FIGURE VII, by a spring 30. That portion of the plastic sheet 29 which is pressed against the base 28 by the marker arm 23 is thus provided with a visible mark such as the line 26 in representation of the variable condition in this case, i.e. the temperature of the liquid 11 in the tank 10 of FIGURE I.

The erasure bar 27 is shown in FIGURE II by means of a cutaway of the plastic sheet 29.

Thus as the plastic sheet 29 is made to adhere to the base 28 by the pressure thereon from the marker arm 23, a record line 26 appears. This line remains on the chart as the chart is rotated, in the case of FIGURE II, counterclockwise, until such time as the beginning of the marked line 26 arrives at the erasure arm 27. Since this arm lies between the base 28 and the plastic sheet 29, continued counterclockwise movement of the chart unit forces the base 28 and the plastic sheet 29 apart. The record line 26 is thus erased and disappears from the face of the plastic sheet 29, leaving a clean chart face ready to be marked again by the arm 23.

A feature of this invention is the use of a device of this nature wherein the plastic sheet has imprinted or otherwise formed thereon a chart pattern. This pattern as illustrated in FIGURE II is a series of concentric circles about the center of the chart device with radial arcing lines as time lines on the chart. The concentric lines are indicative of a range of variable condition values in a radial direction.

FIGURE III is a cross section taken in fragment on the line III—III of FIGURE II, and illustrates a chart unit with the base 28 with a waxy surface 32 on the upper face thereof, and the plastic sheet 29 lying on the waxy surface and in engagement therewith. Thus the plastic sheet may touch the waxy surface without showing a mark until it is forcibly pressed down thereagainst as by a marking stylus on the marking arm 23.

FIGURE IV is a further illustration of the chart unit and is taken on line IV—IV of FIGURE II as if the chart 29 were whole. It shows again the chart unit base 28, the waxy layer 32 thereon, and in this case it shows the erasure arm 27 in partial section, and the plastic sheet 29 on top of the erasure arm, showing the separation of the plastic sheet 29 from the waxy surface 32 of the base 28 as a means of making the record line 26 of FIGURE II disappear.

The FIGURE V showing is a cross section of the erasure arm 27 to illustrate the form thereof, wherein it has a flat bottom face 34 which lies in close proximity to the upper face of the FIGURE II base 28, that is, to the waxy surface 32 in FIGURE IV. Thus the erasure arm is a sort of scraper with a leading edge such as 35 between the plastic sheet 29 and the waxy surface 32 of the chart unit base as a separating arrangement therefor.

If it is desired, a roller device as in FIGURE VI at 36 may be used to again lay the plastic sheet 29 against the waxy surface 32 after the record erasure has been made, and in preparation for a new record thereon as the unit travels in rotation counterclockwise towards the marker arm 23.

The FIGURE VI showing is a further illustration of the action of this chart unit in that the record line 26 is shown as extending from its point of initiation 37 at the marker arm 23, to its point of erasure 38, at the erasure arm 27.

Another form of chart unit which is illustrative of the chart unit device in the combination according to this invention is shown in FIGURE VII.

This is a strip chart continuous type of device wherein the chart unit is in the form of a belt generally indicated at 39, and movable about a pair of rollers 40 and 41. The chart unit 39 is provided with suitable edge drive holes and the rollers 40 and 41 are provided with teeth as at 42, so the chart unit is moved about the rollers as one of the rollers is driven in a suitable conventional manner (not shown). As the rollers are driven, the chart is moved and a marking arm such as 43 is held thereagainst by a suitable spring arrangement such as the spring 30. The marker arm stylus, as at 44, is held against the top of this arrangement so that the chart unit is marked as it passes over the top of the topmost roller 40. In the operation of the device, the variable condition may, for example, move the marker arm 43 in a plane perpendicular to the plane in the drawing so as to move transversely across the moving chart.

The FIGURE VII chart unit is formed with a base 45 which has a waxy, tacky outer surface, and a plastic outer cover 46, which, when pressed against the base by the stylus 44, leaves a record line. The life of this record line is indicated by a dotted line 47 which extends clockwise from the point of the stylus 44 down and around the roller 41 to a point of erasure at 48. This point of erasure is provided by an erasure member 49 which has a narrow oval form edge facing into the oncoming chart unit between the base 45 and the plastic cover 46. As the chart unit moves past the erasure member 49, the base 45 and the plastic cover 46 are separated and the record line disappears. Thus the chart is again clean and ready to be marked by the stylus 44 in the continuous strip chart type of operation of this FIGURE VII device.

The FIGURE VIII showing is illustrative of the FIGURE VII chart portion of the combination according to this invention. In this FIGURE VIII showing, the formation of a chart pattern on a permanent basis is illustrated in the crossing lines 50, so that the device provides the unique combination of a tacky base and a plastic cover with the plastic cover having imprinted or otherwise formed thereon, a chart pattern on which may be marked the record line as at 51, in representation of the variable condition which is being measured and recorded on this temporary basis.

In the operation of the device of the combination according to this invention, therefore, a variable condition may be measured and recorded on a continuous basis with a record kept for a predetermined length of time and then automatically erased, with the same chart being used repeatedly without the necessity for interruption of the measuring process, or of taking the time of an operator to replace charts, or of the expense of a constant series of new charts.

This invention therefore provides a new and improved industrial instrument system combination including a continuous reusable recording chart device wherein a chart record is made, maintained for a predetermined time, and then automatically erased.

As many embodiments may be made of the above invention and as changes may be made in the embodiment set forth above without departing from the scope of the invention, it is to be understood that all matter hereinbefore set forth or shown in the accompanying drawings is to be interpreted as illustrative only and not in a limiting sense.

I claim:

A recording device for use in combination in an industrial instrumentation system, said device comprising a pair of horizontally disposed, vertically separated, parallel rollers, at least one of which is to be driven in rotation about its axis as a roller, a set of sprockets on each of said rollers, an endless belt strip chart base provided with an outer face tacky surface and mounted over and on said rollers, said strip chart base belt having edge openings therein for receiving said sprockets to provide positive driving movement to said strip chart base belt from said rollers through said sprockets, an endless belt plastic strip mounted over said rollers and on said strip chart base belt in close engagement therewith over both of said rollers with the length of said plastic strip belt essentially the same as the length of said chart base belt, said plastic strip also having edge openings therein for receiving said sprockets, whereby said base belt and said plastic belt are driven over and around said rollers together, with no slippage between said belts lengthwise or transversely thereof, said plastic belt having a recording chart pattern imprinted thereon, a marking stylus spring biased against said plastic belt, downwardly as against the top of the upper one of said rollers, said stylus being established for movement transversely of said chart, along the top length of said upper roller in response to changes in a variable condition, and a separator arm disposed between said rollers and between said belts, said arm having a flat face against said base belt, and an arcuate face against said plastic belt, whereby stylus markings provided as said plastic belt is pressed against said base belt, are cleared from visibility with respect to said chart pattern as said belts are driven past said separator arm.

References Cited in the file of this patent

UNITED STATES PATENTS

| | | |
|---|---|---|
| 1,700,399 | Bruhn | Jan. 29, 1929 |
| 1,706,046 | Tisdale | Mar. 19, 1929 |
| 2,921,595 | Erbguth | Jan. 19, 1960 |

FOREIGN PATENTS

| | | |
|---|---|---|
| 576,596 | Great Britain | Apr. 11, 1946 |